May 9, 1950  C. H. WHITE  2,506,658
SEED MEASURING PLATE WITH STREAMLINE DISCHARGE GUIDE
Filed Dec. 21, 1944  2 Sheets-Sheet 1
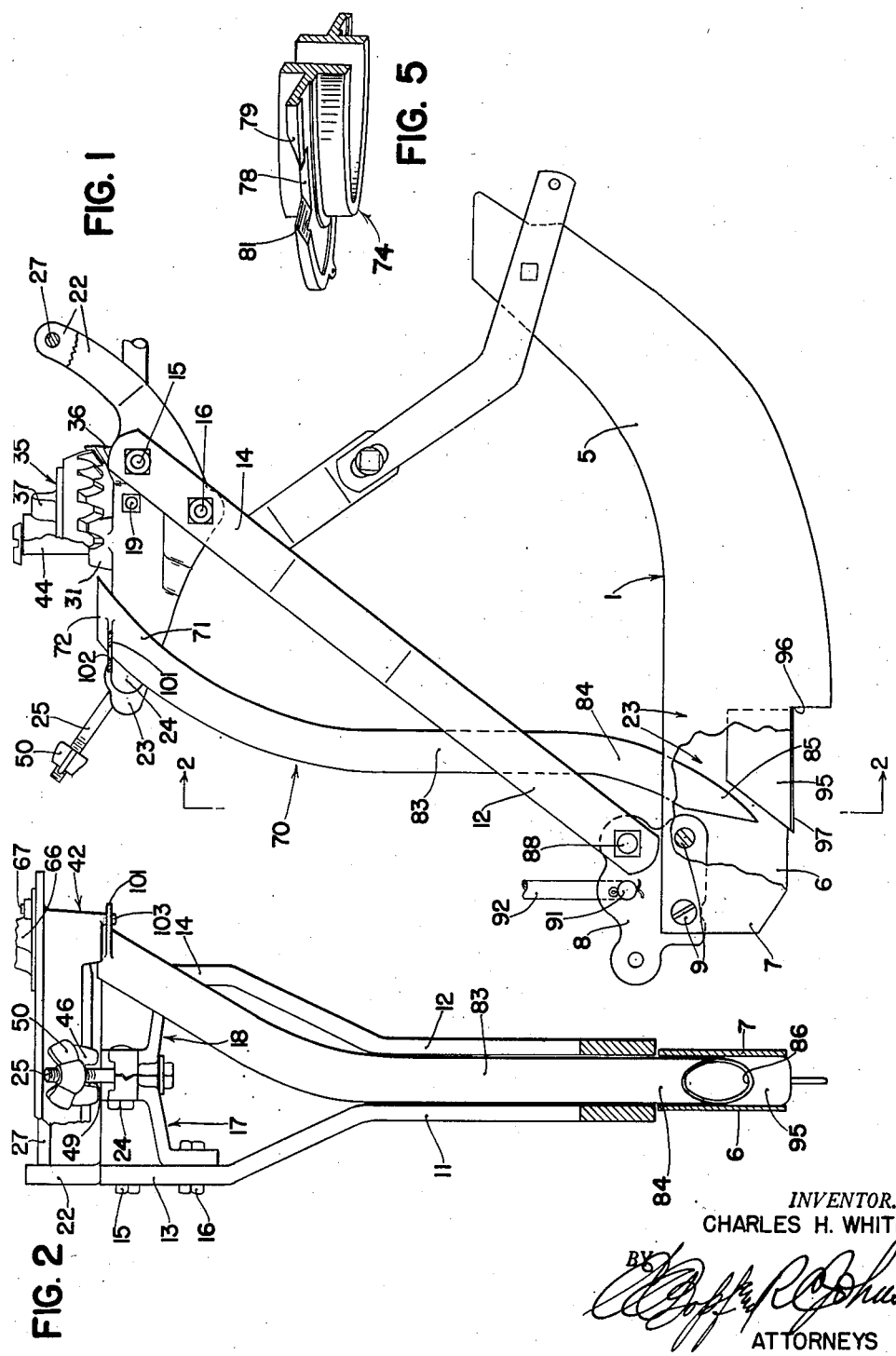
INVENTOR.
CHARLES H. WHITE
ATTORNEYS

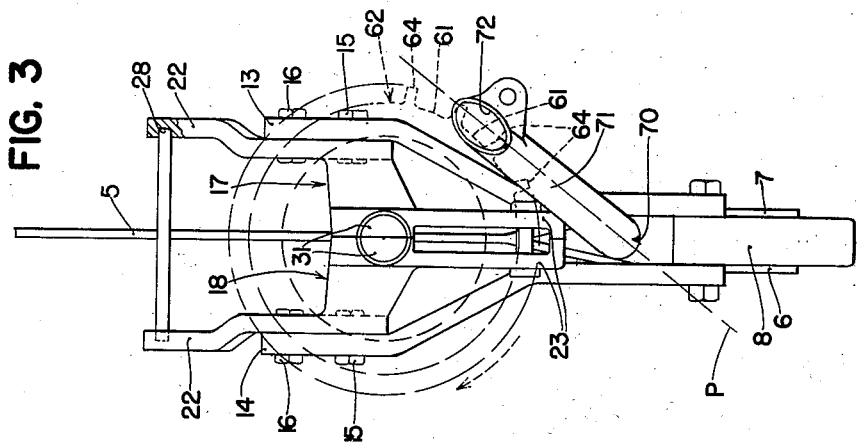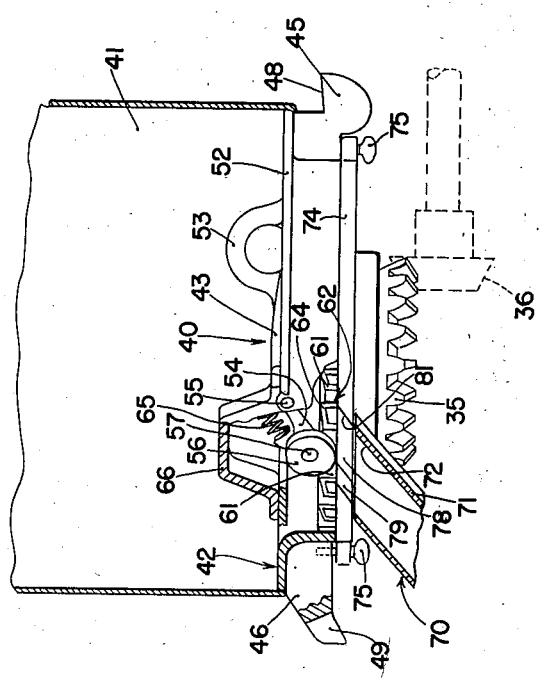

Patented May 9, 1950

2,506,658

UNITED STATES PATENT OFFICE 2,506,658

SEED MEASURING PLATE WITH STREAMLINE DISCHARGE GUIDE

Charles H. White, Moline, Ill., assignor to Deere & Company, Moline, Ill., a corporation of Illinois Application December 21, 1944, Serial No. 569,198

7 Claims. (Cl. 222—367)

The present invention relates generally to planters and more particularly to corn planters and the like.

The object and general nature of the present invention is the provision of a planter which is especially constructed and arranged so as to plant at higher speeds than have heretofore been thought possible. More particularly, it is a feature of this invention to provide means for selecting at a rapid rate the seed to be deposited and then conducting the seed into the seed receiving furrow by means of a smoothly curving seed conducting tube which is so placed as to receive the seed and shaped to conserve the kinetic energy of the seed imparted to the latter by the relatively rapid movement of the seed connecting mechanism. Specifically, it is a feature of this invention to provide seed selecting means which is operable at fairly high speeds and which provides for a change in the direction of movement of the seed in a gradual and uniform manner, thus preventing injurious rebounding of the seed which, if permitted, would delay the passage of the seed into the seed receiving furrow. Another important feature of the present invention lies in the provision of means to prevent soil from being forced into the discharged end of the seed passage when the planter furrow openers are dropped abruptly to the ground from a raised or transport position.

These and other objects and advantages of the present invention will be apparent to those skilled in the art after a consideration of the following detailed description, taken in conjunction with the accompanying drawings in which is disclosed structure incorporating the principles of the present invention.

In the drawings:

Figure 1 is a side view of a planter runner structure and associated parts, in which the principles of the present invention have been incorporated.

Figure 2 is a rear view and Figure 3 is a top view of the structure shown in Figure 1.

Figure 4 is a partial sectional view showing the upper end of the seed receiving conduit and its relation to the seed discharging members of the seed selecting mechanism.

Figure 5 is a perspective view showing the seed plate supporting member with the seed opening therein beveled to accommodate the rapid discharge of the seed.

Referring first to Figures 1 and 2, the reference numeral 1 indicates a furrow opener of the runner or shoe type. The furrow opener 1 is made up of a pair of plates suitably secured together, as by welding, forging or the like, so as to form a narrow front end 5 and two laterally spaced rear side sections 6 and 7. A mounting block 8 is fastened, as by bolts 9, or the like, between the rear side sections 6 and 7. A pair of shank bars 11 and 12 are bent at their upper portions to form a pair of laterally spaced upper sections 13 and 14 which are apertured so as to receive bolts 15 and 16 by which a pair of right and left hand mating hopper mounting members 17 and 18 are secured, respectively, to the shank bars 11 and 12. Preferably, the bolts 15 and 16 are arranged in pairs and a bolt 19 (Figure 1) passes through the central portions of both of said upper mounting members 17 and 18 for holding the latter in position. The members 17 and 18 are preferably castings formed as mating parts, each having a forwardly extending arm 22 and a rearwardly extending arm 23. The latter are spaced fairly close together and are apertured to receive a pivot bolt 24 upon which a wing bolt 25 is swively mounted, as best shown in Figures 1 and 2. The upper ends of the forward hopper mounting member sections 22 are apertured to receive a pin 27, the apertures preferably being formed as sockets 28, as best shown in Figure 3. Upwardly extending portions 31 are formed on the member 17 and 18 so that, when the members are assembled, the extensions 31 serve as a stud to receive and rotatably support a driving gear 35 (Figure 4). The gear 35 is driven in any suitable manner, as by a pinion 36 (Figure 4), carried by any suitable means, as by a shaft or the like on the mounting members 17 and 18, and the gear 35 is provided with seed plate driving lugs 37 (Figure 1).

The seed selecting mechanism is indicated in its entirety in Figure 4 by the reference numeral 40 and is largely of conventional construction. Referring now to Figure 4, a hopper 41 is mounted on a hopper base 42 and the latter includes a central section 43 having a central socket (not shown) which receives a stationary stud 44 (Figure 1) which is carried by and forms a part of the stud 31. The hopper base 42 is in the nature of a flanged member and carries at one side a pair of shouldered lugs 45 and at the other side a slotted lug 46. The shoulder on each of the pair of lugs 45 is indicated by the reference numeral 48, and the hopper base 42 is adapted to be mounted on the mounting members 17 and 18 by engaging the shoulders 48 on the lugs 45 underneath the pin 27. The hopper base then swings downwardly until the socket, mentioned above, seats on the stud 44. The wing bolt 25 may then be swung up into a position into the slot 49 in the lug 46 and the wing nut 50 then tightened. The central section 43 of the hopper base 42 is joined to the flanged portion 52 thereof by arched bridges 53, and at one side of the hopper base a knock-out lever 54 is pivoted, as at 55, to the base 42. At the other end the knock-out lever 54 carries a knock-out roller 56 which is mounted on a pin 57 to rotate freely. The roller 56 is disposed adjacent the periphery of the base 42 and in a position to pass into the seed cells 61 that are formed on a seed plate 62 by a plurality of tooth-like extensions 64. A spring 65 biases the knock-out roller for a movement in a downward direction into the seed cells 61 successively, and a cover 66 is carried by the base 42 and fixed, as by a bolt 67 to the base 42. As best shown in Figure 3, the seed plate 62 rotates in a generally horizontal plane about the axis of the stud 31. The direction of rotation is indicated by the dotted arrow in Figure 3. The seed plate 62 is provided with sockets or the like to receive the lugs 37 on the gear 35, or any other suitable means may be provided whereby rotating the gear 35 will rotate the seed plate 62.

A seed conduit tube 70 is provided for conducting the seed selected by the mechanism 40 downwardly into a furrow in the soil opened by the furrow opener 1. The present invention is particularly concerned with the shape of the tube 70. Referring first to Figures 1 and 4, it will be seen that the upper section 71 of the tube is curved and is provided with an upper seed receiving inlet opening 72 which is disposed immediately underneath the knock-out roller 56, as shown in Figure 4. This figure also shows that the seed selecting mechanism 40 includes a false ring member 74 on the lower side of the base 42 and held in position by a pair of thumb screws 75. This ring 74 holds the seed plate 62 in position and also serves as a support for the several seeds as they move into the seed cells 61. The ring member 74 is provided with a seed discharge opening 78 in the form of a notch having front and rear beveled edges 79 and 81, as best shown in Figure 5, the angle of the beveled edges 79 and 81 corresponds approximately to the angle that the upper end 71 of the seed tube 70 makes with respect to the plane of the ring member 74. As best shown in Figure 3, the vertical plane (perpendicular to the plane of the paper, Figure 3) containing the upper end 71 of the seed tube is tangent to the path of movement of the seed cells 61 at the point where the knocker 56 is mounted, this point being substantially directly over the inlet end 72 of the upper end portion 71 of the seed tube 70. The latter curves in a smooth uniform manner downwardly and somewhat rearwardly, as best shown in Figures 1 and 2, merging into a generally vertically disposed straight portion 83, the straight portion being disposed in the vertical longitudinal plane of the runner 1, as best shown in Figure 2, this portion of the seed tube 70 lying between the shank bars 11 and 12. Preferably, the tube 70 is welded to one of the shank bars 11 and 12. The seed tube 70 passes downwardly between the shank bars 11 and 12 and has a lower end portion 84 which is shaped to curve downwardly and rearwardly, as indicated at 85 in Figure 1, terminating in a lower discharge opening 86. This opening is disposed between the side plates 6 and 7 of the planter runner 1 and is just forward of the mounting block 8 which is bolted to the runner sides 6 and 7. The space between these side portions is sufficient to accommodate and, in fact, forms the rear portion of the seed passage for the seed selected and discharged by the seed selecting mechanism 40. The lower ends of the shank bars 11 and 12 are secured, as by a bolt 88, to the mounting member 8. The particular curvature, at 85, of the lower end portion of the seed tube 70 is sufficient to give the seed a rearward component of movement, sufficient to equal the speed of forward travel of the planter.

The mounting block 8, as best shown in Figure 1, is apertured, as at 91, to receive a lifting link 92. The latter is connected to any suitable form of lifting mechanism by which the runners 1 may be raised into a transport position. Sometimes the runners 1 are dropped from their transport position with considerable force to the ground, and not infrequently this action causes soil to become plugged in the lower portions of the seed passage, which in the present instance is made up of the lower end of the tube 70 and the cooperating space between the runner sides 6 and 7. According to the present invention, means is provided for preventing soil and the like from being forced up into the lower portion of the seed passage when the runners are dropped to the ground. To this end, I have provided a block 95 disposed substantially directly underneath the lower curved end 85 of the seed tube 70 and substantially filling the space between the runner sides 6 and 7 substantially all the way from the notch 86 to a point below and in rear of the lower end of the seed tube. The lower face 97 of the block 95 is rounded. The action of the block 95 is to prevent the runner from penetrating the ground even though it be dropped with considerable force. This protects the lower end of the seed tube 70 and prevents any soil from being forced up into the space between the runner sides 6 and 7.

The upper end 71 of the seed tube 70 is provided with a lug 101 which is apertured, as at 102 (Figure 1), to receive a stud 103 carried by the cooperating portion of the hopper base 42. The seating of the lug 103 in the opening in the lug 101 serves to accurately register the upper end 72 of the seed tube with the hopper base so that the inlet end of the tube lies in the proper position with respect to the opening 78 in the ring member 74 and also with respect to the knocker 56.

The operation of the planter as described above is substantially as follows:

As the seed plate 62 and associated parts are rotated, in the direction of the dotted arrow shown in the lower left portion of Figure 3, the seeds in the hopper 41 move into the seed cells 61. As the cells come, one by one, over the opening 78 underneath the knocker 56, it being understood that the latter rolls along over the teeth 64 and is urged downwardly by the spring 65, the seeds fall by the action of gravity, aided if necessary by the knocker which positively ejects any seed that tends to stick in the seed cell, generally downwardly from the seed cell 61 and are directed into the upper end 71 of the seed tube 70. Due to the rotation of the seed plate 62 and the ejecting action, energized by gravity or the spring 65 of the knocker or ejector 56, or both, the motion imparted to each seed as it leaves the seed plate is the resultant of two movements, namely, the movement imparted thereto by the rotating seed plate 62, and the movement imparted to the seed by the action of gravity and/or the knocker. It will be understood, of course, that as the seed leaves its seed cell 61 it tends to move away from the seed plate in a tangential direction, namely, a direction that lies in the plane of the upper end 71 of the seed tube 70. This plane is indicated in Figure 3 by the broken line P. As has been described above, this plane is in tangential relation with respect to the path of movement of the seed cells, which is circular in the present instance. Due to the ejecting action each seed moves not only in a generally tangential direction but also in a downward direction, the above mentioned resultant being a direction that lies in the plane P but in a downward direction. The curvature or angle of the upper end 71 of the seed tube and the angle of the beveled walls 78 and 79 on the plate 74 correspond generally to the angle of this resultant movement in the plane P. Thus, as each seed leaves its seed cell 61 there is no loss of kinetic energy which the seed possesses by virtue of the movement imparted thereto by the rotation of the seed plate. Each seed after it leaves the seed cell becomes a free moving body and is acted on by gravity in addition to the forces mentioned above. The resultant path of movement of the seed corresponds approximately to the curvature of the upper portion of the seed tube, best shown in Figures 1 and 2. The tube has smoothly curving walls and each seed drops smoothly down through the tube without rebounding from one wall to the other and in some instances without ever contacting the inner surface of the tube at the upper portion thereof. The curvature of the lower end of the seed tube, as indicated at 85, is provided for the purpose of imparting a rearward component of movement to the seed so that the rearward component of this movement is as near as possible the speed of forward advance of the planter so that, relative to the ground, each seed is deposited in a directly downward direction so that there is no tendency for the seed to roll or otherwise become displaced in the furrow opened by the soil opener 1. Since the curvature of the upper portion of the seed tube corresponds to the normal path of movement of the seed, projected generally rearwardly and downwardly by the combined action of the rotating seed plate and of gravity when the seed falls out of the seed plate through the opening 78 in the false ring or ring member 74, the inherent kinetic energy of each seed is conserved so that, with substantially no loss of velocity, there is no tendency for the seed to bounce back and forth in the seed tube or dissipate its inherent kinetic energy by such rebounding. Therefore, possessing practically all of its kinetic energy, due to the rotation of the seed plate, the seed when it reaches the lower curved section 85 is directed rearwardly with substantially the same velocity as the rate of forward movement of the planter.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter, a seed plate rotatable in a generally horizontal plane and having a peripheral series of seed cells, means for releasing the seed at a given point in the rotation of said seed plate, and a seed tube on the lower side of said seed plate having a seed receiving inlet disposed below the seed cells at said discharge point, said tube extending downwardly and outwardly away from said seed plate in a generally vertical plane that is disposed in generally tangential relation to said seed plate at said discharge point.

2. A high speed planter comprising a rotary seed plate having peripheral seed cells, a false ring fixed against rotation and supporting said rotary seed plate, said false ring having an opening underneath the path of movement of said seed cells and said opening having the edge thereof that is disposed in a forward direction with respect to the rotation of said seed plate beveled off on the underside thereof so as to accommodate the continued movement of said seed in its normal trajectory due to the kinetic energy of said seed imparted thereto by the rotation of said seed plate, after the ejection of said seed from said seed cells and during the passage of said seed through the opening in said false ring, and a seed tube disposed below said false ring and seed plate and having an upper seed-receiving portion extending downwardly and away from the seed plate in a line that extends in generally parallel relation with respect to the beveled underside portion of said opening with the portions of the walls of the upper end of said seed tube generally in alignment with the beveled portion of the opening in said false ring.

3. A high speed planter comprising a rotary seed plate having peripheral seed cells, a false ring fixed against rotation and supporting said rotary seed plate, said false ring having an opening underneath the path of movement of said seed cells to receive ejected seed from said seed cells, seed ejecting means acting generally downwardly to eject seed from said seed cells, the opening in said false ring having the edge thereof that is disposed in a forward direction with respect to the rotation of said seed plate beveled off on the underside thereof at about an angle corresponding to the angle of the resultant of the forward velocity imparted to the seed by the rotation of said seed plate and the downward velocity imparted to the seed by said downwardly acting seed ejecting means, and a seed conduit disposed under said false ring and having a seed receiving section disposed substantially at the same angle as the beveled edge of said false ring so as to accommodate the continued movement of said seed in its normal trajectory due to the kinetic energy of said seed imparted thereto by the rotation of said seed plate, after the ejection of said seed from said seed cells and the passage of the seed through the opening in the false ring 4. In a planter, a seed plate rotatable in a generally horizontal plane and having a plurality of seed cells around the periphery thereof, a seed ejector on the upper side of said seed plate for ejecting the seed downwardly from said cells during the rotation of said plate, and a curved seed receiving conduit of substantially constant cross section disposed on the underside of said plate, the upper part of said conduit being disposed in a generally vertical plane that is disposed in generally tangential relation with respect to the path of rotation of said seed cells at a point corresponding to the location of said seed ejector and having a downward curve from said point corresponding generally to the trajectory of the seed ejected from said cells during rotation of said seed plate.

5. A high speed planter comprising a rotary seed plate having peripheral seed cells, a false ring fixed against rotation and supporting said rotary seed plate, said false ring having an opening underneath the path of movement of said seed cells to provide for the release of seed from said seed cells by the action of gravity, the opening in said false ring having the edge thereof that is disposed in a forward direction with respect to the rotation of said seed plate beveled off on the underside thereof at about an angle corresponding to the angle of the resultant of the forward velocity imparted to the seed by the rotation of said seed plate and the downward velocity imparted to the seed by the action of gravity, and a seed conduit disposed under said false ring and having a seed receiving section disposed substantially at the same angle as the beveled edge of said false ring so as to accommodate the continued movement of said seed in its normal trajectory due to the kinetic energy of said seed imparted thereto by the rotation of said seed plate and the action of gravity, after the release of said seed from said seed cells and the passage of the seed through the opening in the false ring.

6. A planter adapted normally to be moved forwardly when in operation and comprising movable seed delivering means, and a seed conduit adapted to receive seed therefrom and including a tube adapted to enclose the seed on all sides and having smooth inner walls and shaped to have an inlet opening and adjacent portion extending generally in the direction of movement of said seed delivering means at the point of discharge of seed therefrom, said tube also being shaped to lead gradually away from said direction in a substantially smooth curve into a substantially directly downward direction toward the ground so as to retain a substantial amount of the initial velocity of said seed imparted thereto by said movable seed delivering means, said tube also having a lower portion extending generally downwardly and rearwardly so as to impart a rearward component of movement to the seed discharged therefrom.

7. A high speed planter comprising a rotary seed plate having peripheral seed cells, an apertured part fixed against rotation and disposed below said rotary seed plate, said part having an opening underneath the path of movement of said seed cells to provide for the movement of seed outwardly and downwardly from said seed cells, the opening in said part having the edge thereof that is disposed in a forward direction with respect to the rotation of said seed plate beveled off on the underside thereof at about an angle corresponding to the angle of the resultant of the forward velocity imparted to the seed by the rotation of said seed plate and the downward velocity imparted to the seed during its ejection from said seed plate, and a seed conduit disposed under said apertured part and having an upper seed receiving section disposed substantially at the same angle as said beveled edge so as to accommodate the continued movement of said seed in its normal trajectory due to the kinetic energy of said seed imparted thereto by the rotation of said seed plate, after the release of said seed from said seed cells and the passage of the seed through the opening in said apertured part.

CHARLES H. WHITE.

REFERENCES CITED

The following references are of record in the file of this patent:

UNITED STATES PATENTS

| Number | Name | Date |
|---|---|---|
| 126,250 | Barbour | Apr. 30, 1872 |
| 214,683 | Miller | Apr. 22, 1879 |
| 308,585 | Watts | Nov. 25, 1884 |
| 601,870 | Davison | Apr. 5, 1898 |
| 982,089 | Patric | Jan. 17, 1911 |
| 1,068,547 | Tuggle | July 29, 1913 |
| 1,317,133 | Hilton | Sept. 23, 1919 |
| 1,605,210 | Bohmker | Nov. 2, 1926 |
| 1,968,641 | Greig | July 31, 1934 |

FOREIGN PATENTS

| Number | Country | Date |
|---|---|---|
| 270,497 | Great Britain | May 12, 1927 |
| 301,180 | Italy | Sept. 28, 1932 |
| 345,082 | Germany | Dec. 3, 1921 |